United States Patent [19]

Sakamoto

[11] Patent Number: 4,968,913
[45] Date of Patent: Nov. 6, 1990

[54] TWO-PHASE BRUSHLESS MOTOR

[75] Inventor: Satoshi Sakamoto, Tokyo, Japan

[73] Assignee: Sony Corporation, Tokyo, Japan

[21] Appl. No.: 397,330

[22] Filed: Aug. 21, 1989

Related U.S. Application Data

[63] Continuation of Ser. No. 19,215, Feb. 26, 1987, abandoned.

[30] Foreign Application Priority Data

Feb. 27, 1986 [JP] Japan .................................. 61-42701

[51] Int. Cl.$^5$ .......................................... H02K 21/12
[52] U.S. Cl. .................................. 310/156; 310/68 B;
310/184; 310/268; 318/254
[58] Field of Search ............... 310/268, 156, 180, 184,
310/181, 68 R, 68 B, 265, 261, 254, 46, 177, 254;
324/208; 318/254

[56] References Cited

U.S. PATENT DOCUMENTS

| | | | |
|---|---|---|---|
| 3,317,766 | 5/1967 | Bensa | 310/156 |
| 4,125,792 | 11/1978 | Schmider | 310/268 |
| 4,217,508 | 8/1980 | Uzuka | 310/46 |
| 4,340,833 | 7/1982 | Sudo | 310/268 |
| 4,394,594 | 7/1983 | Schmider | 310/268 |
| 4,455,516 | 6/1984 | Furusho | 310/268 |
| 4,520,300 | 5/1985 | Fradella | 310/268 |
| 4,585,979 | 4/1986 | Sakamoto | 310/68 R |
| 4,677,332 | 6/1987 | Heyraud | 310/268 |
| 4,703,211 | 10/1987 | Yazaki | 310/184 |
| 4,704,566 | 11/1987 | Hirano | 310/156 |
| 4,737,674 | 4/1988 | Miyao | 310/268 |
| 4,739,203 | 4/1988 | Miyao et al. | 318/254 |

FOREIGN PATENT DOCUMENTS 2386928 11/1978 France .
1604121 12/1981 United Kingdom .
1604122 12/1981 United Kingdom .

OTHER PUBLICATIONS

Patent Abstract of Japan, vol. 7, No. 99 (E-172) (1244), Apr. 27, 1983.
Patent Abstract of Japan, vol. 7, No. 36 (E-158)(1181), Feb. 15, 1983.
Patent Abstract of Japan, vol. 7, No. 214 (E-199)(1359), Sep. 21, 1983.

*Primary Examiner*—R. Skudy
*Attorney, Agent, or Firm*—Hill, Van Santen, Steadman & Simpson

[57] ABSTRACT

A two-phase brushless motor has a rotor comprising at least a pair of first magnetic poles and a pair of second magnetic poles which are smaller in width than the first magnetic poles, and a stator comprising at least a pair of first coils and a pair of second coils for producing a first phase and a second phase of varying magnetic fields, respectively, so that the torques respectively obtained from the interaction of the two pairs of magnetic poles and the two phases produced by the two pairs of coils differ from each other.

2 Claims, 11 Drawing Sheets

FIG.10G ⑦POINT

FIG.10H ⑧POINT

FIG.10I ⑨POINT

TWO-PHASE BRUSHLESS MOTOR

This is a continuation of 019,215, filed 2-26-87, now abandoned.

BACKGROUND OF THE INVENTION

1. Field of the Invention

The present invention relates generally to a two-phase brushless motor.

2. Description of the Related Art

Figure 1:
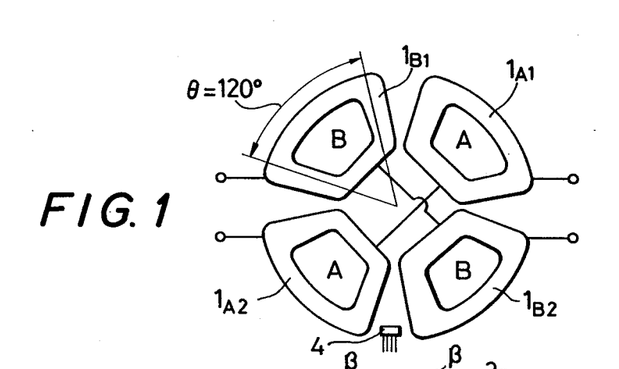
FIG. 1 is a plan view of a stator coil arrangement of a conventional two-phase brushless motor, to which this invention is applicable.
Figure 2:
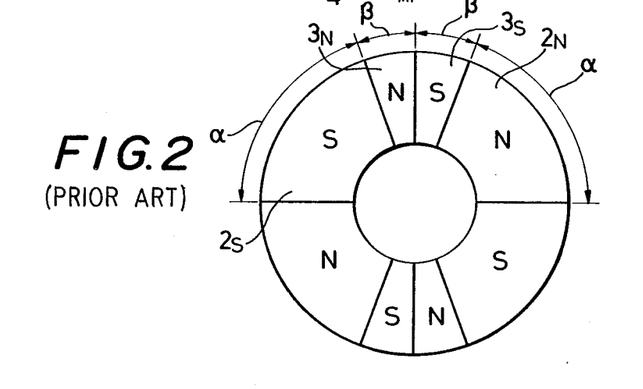
FIG. 2 is a plan view of a known rotor magnet arrangement coupled with the stator of FIG. 1.

FIGS. 1 and 2 are plan views of a stator and a disk-shaped rotor, respectively, of a conventional two-phase brushless motor. In the brushless motor, the stator in FIG. 1 comprises two pairs of coils $1_{A1}$, $1_{B1}$, $1_{A2}$, and $1_{B2}$ for producing two phases of varying magnetic fields (hereinafter denoted phase A and phase B). The rotor shown in FIG. 2 comprises four main magnetic poles which are in opposed relation to the stator and is rotationally mounted with respect thereto. An angle $\theta$, expressed as an electrical angle between effective portions of each of the coils $1_{A1}$, $1_{A2}$, $1_{B1}$, and $1_{B2}$ which produces phase A or B, is not 180° electrical but instead is 120° electrical.

Figure 3:
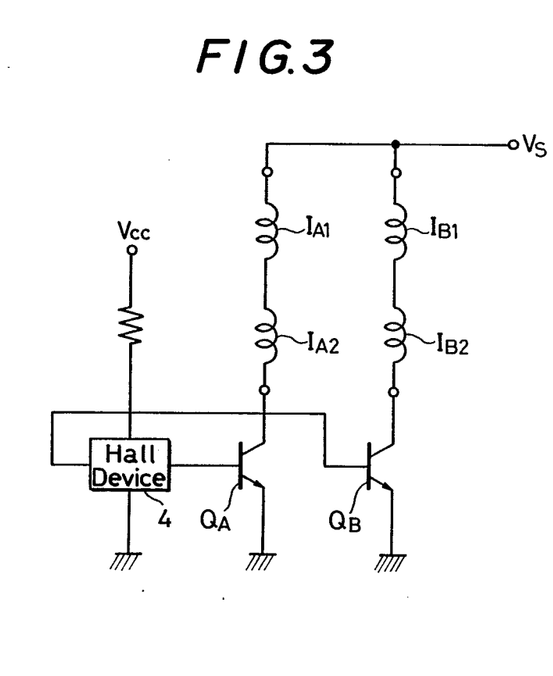
FIG. 3 is a circuit diagram for controlling the conventional two-phase brushless motor of FIGS. 1 and 2.

The pair of coils $1_{A1}$ and $1_{A2}$ for producing phase A, and the pair of coils $1_{B1}$ and $1_{B2}$ for producing phase B may be connected in series or in parallel, but in FIG. 1, the coils are respectively in series connection, and an electric current is alternately supplied at every angle of 180° to the coils $1_{A1}$ and $1_{A2}$ and the coils $1_{B1}$ and $1_{B2}$ with the help of a control circuit shown in FIG. 3.

As shown in FIG. 3, the coils $1_{A1}$ and $1_{A2}$ and the coils $1_{B1}$ and $1_{B2}$ each joined in series connection are connected to collector leads of respective transistors $Q_A$ and $Q_B$ and are also each connected to a power source $V_S$. A Hall-effect device 4 connected to a power source $V_{CC}$ detects the rotation angle of the rotor, and makes conductive one of the transistor circuits on the one hand and makes non-conductive the other of transistor circuits on the other hand, or vice versa, so that electric current is alternately supplied to either the coils $1_{A1}$ and $1_{A2}$ or the coils $1_{B1}$ and $1_{B2}$.

In the rotor of FIG. 2, two pairs of main magnetic poles $2_N$ and $2_S$ are each provided having a width $\alpha$, and respective pairs of supplemental magnetic poles $3_N$ and $3_S$ each of width $\beta$ are sandwiched between the two pairs of main magnetic poles $2_N$ and $2_S$. For the sake of simplicity, reference symbols have been supplied only on the top portion of FIG. 2, although the symbols also apply to corresponding elements of the lower portion, as well.

Figure 4:
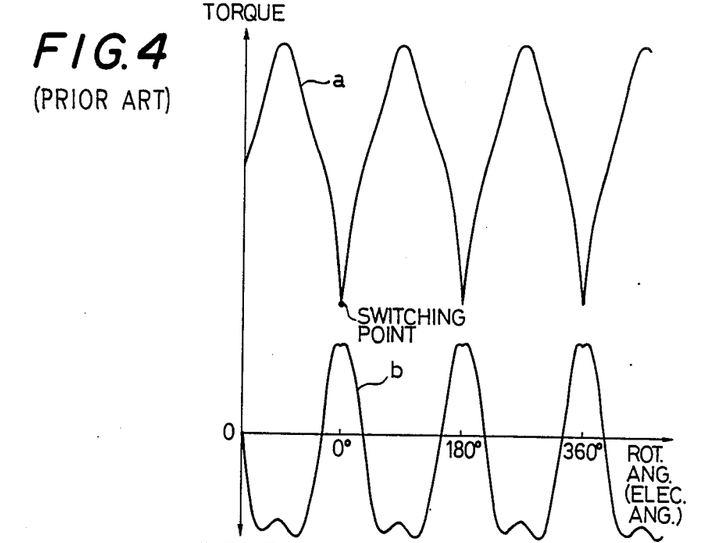
FIGS. 4 and 5 are diagrams of the torque characteristics per electrical rotor angle of the conventional two-phase brushless motor.
Figure 5:
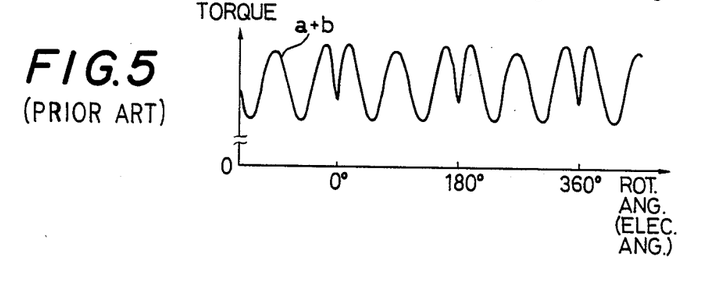

Curve a in FIG. 4 shows the relationship between rotational angles and torques of the motor under the condition that only the main magnetic poles $2_N$ and $2_S$ function, and the width $\alpha$ of FIG. 2 is 140° electrical and the width $\beta$ of FIG. 2 is 40° electrical. Similarly, curve b shows the relationship between torque and rotational angles under the condition that only the supplemental magnetic poles $3_N$ and $3_S$ function. Curve a+b illustrated in FIG. 5 shows the torque/angle relationship under the condition that both the main magnetic poles $2_N$ and $2_S$ and the supplementary magnetic poles $3_N$ and $3_S$ function, curve a+b being obtained by superposing curve b on curve a. According to FIGS. 4 and 5, it is apparent that the sharp drop in torque at every switching point in curve a is compensated by an increase in torque on curve b.

In the above two-phase brushless motor, the magnetic poles are symmetrically arranged, so that the same torque waveforms are simultaneously produced by the coils $1_{A1}$ and $1_{A2}$ and the same may be said of the torque waveforms produced by the coils $1_{B1}$ and $1_{B2}$.

The rotor shown in FIG. 2 has the wide magnetic poles $2_N$ and $2_S$ and the extremely narrow supplemental magnetic poles $3_N$ and $3_S$, so that it is difficult to magnetize the rotor, particularly the rotor of a brushless motor used in a video tape recorder or the like, because there is a tendency to make brushless motors for video tape recorders or the like smaller in size. Furthermore, as the hysteresis characteristic disperses due to the existence of the wide magnetic poles and extremely narrow magnetic poles, torque ripples are apt to be generated, which thereby often disperses the torque characteristic of the brushless motor.

SUMMARY OF THE INVENTION

Accordingly, it is an object of the present invention to provide a two-phase brushless motor in which extremely narrow magnetic poles are not provided so that the rotor thereof is easy to magnetize.

In accordance with an aspect of the present invention, a two-phase brushless motor is provided having a rotor with at least a pair of magnetized main regions and a pair of magnetized sub-regions, the former region and the latter region having the ratio of two to one, and a stator positioned in opposed relation to the rotor and having at least two pairs of coils for producing respective phases of magnetic fields, the two coils in the pair of coils being spaced from each other at an angle of approximately 360° electrical.

DESCRIPTION OF THE PREFERRED EMBODIMENTS

Figure 6:
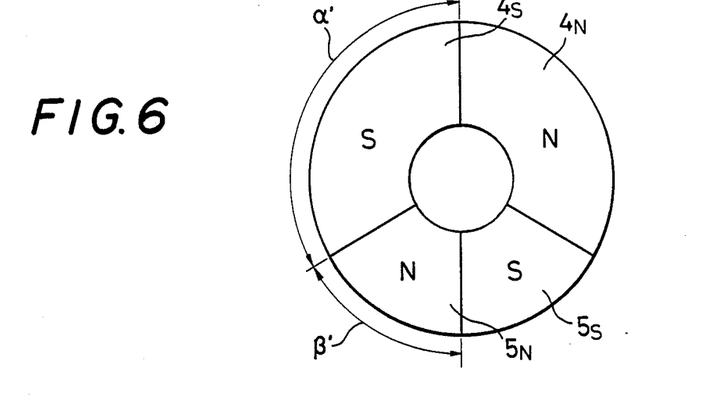
FIG. 6 is a plan view of a rotor magnet arrangement of a two-phase brushless motor which exemplifies one magnetizing pattern according to a first embodiment of this invention.

In FIG. 6 which shows the first embodiment of the present invention, magnetic poles $4_N$ and $4_S$ in a disk-shaped rotor of a two-phase brushless motor, each having a width $\alpha'$, are adjacent to each other, and a pair of magnetic poles $5_N$ and $5_S$ each having a width $\beta'$ are sandwiched between the magnetic poles $4_N$ and $4_S$. The electrical angles $\alpha'$ and $\beta'$ corresponding to the widths $\alpha'$ and $\beta'$ and about 240° electrical and about 120° electrical, respectively. That is, the electrical angles $\alpha'$ and $\beta'$ have a ratio of two to one. Further, the stator of the motor and the circuit for controlling the motor are the same as those shown in FIGS. 1 and 3. Such motor is commonly called a pancake motor.

Figure 7:
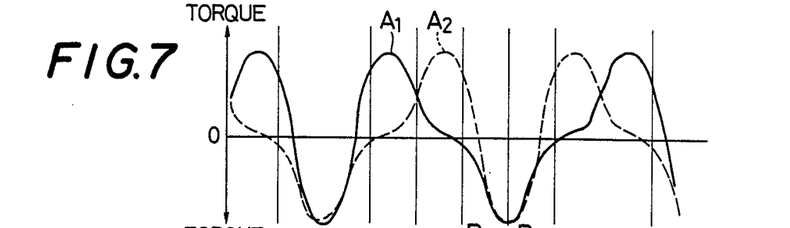
FIGS. 7, 8 and 9 are diagrams of the torque characteristics per rotor angle of the two-phase brushless motor having the rotor of FIG. 6.
Figure 8:
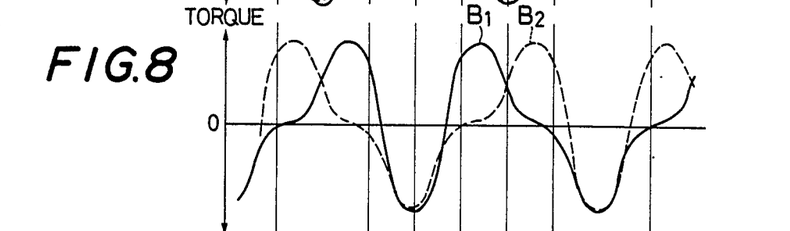

FIGS. 7 and 8 show diagrams of torque characteristics per electrical angle of the motor comprising the rotor of FIG. 6, the stator of FIG. 1, and the controlling circuit of FIG. 3.

In FIG. 7, curves $A_1$ and $A_2$ show the respective torque waveforms of the motor obtained due to magnetic fields produced by the coils $1_{A1}$ and $1_{A2}$. Similarly, in FIG. 8, curves $B_1$ and $B_2$ show respectively the torque waveforms of the motor obtained due to magnetic fields produced by the coils $1_{B1}$ and $1_{B2}$.

Figure 9:
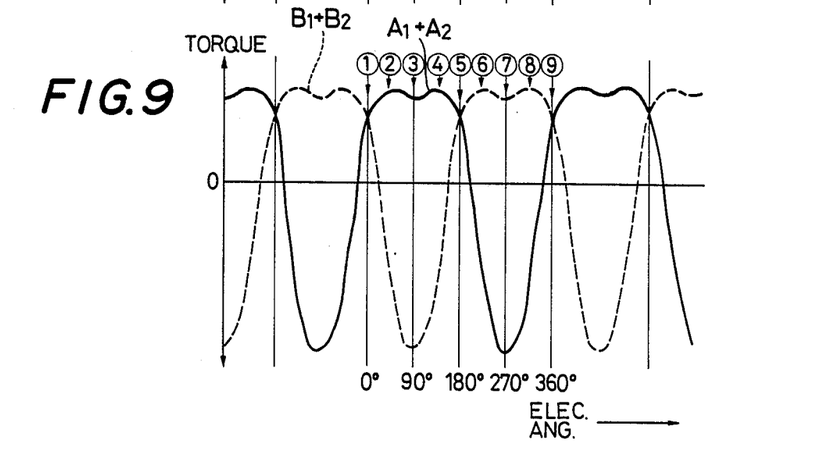
Figure 10A:
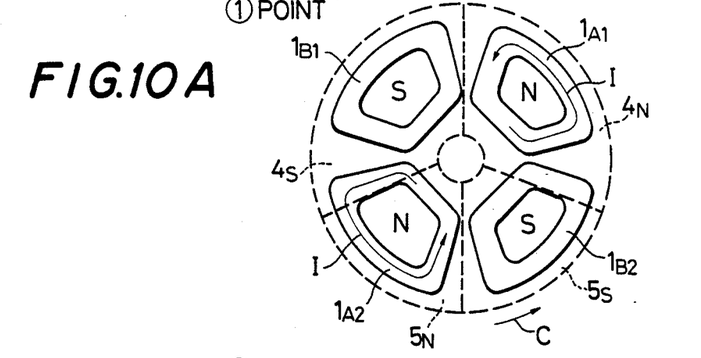
FIGS. 10A to 10I are plan views of the stator and rotor of FIGS. 1 and 6, respectively, for explaining the relations between the stator and the rotor located at various rotational angles.
Figure 10B:
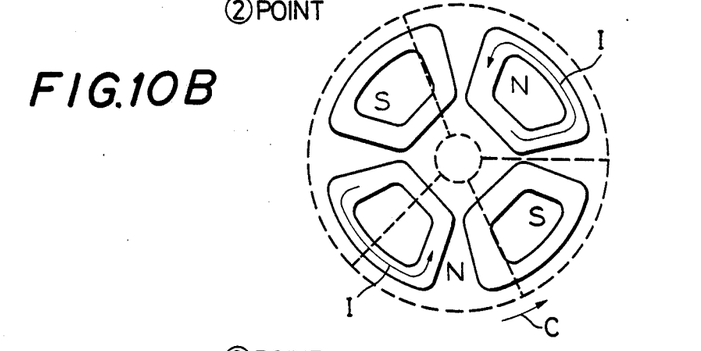
Figure 10C:
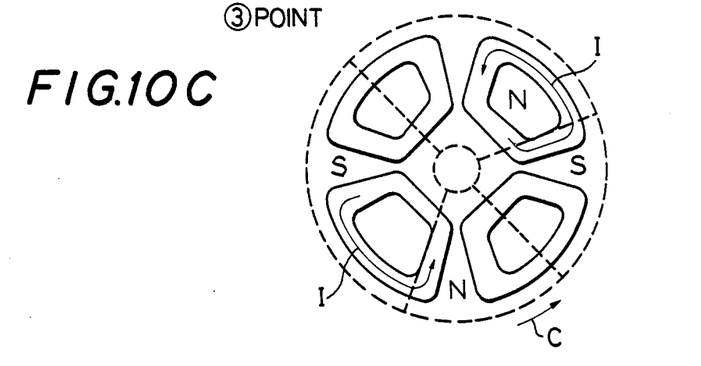
Figure 10D:
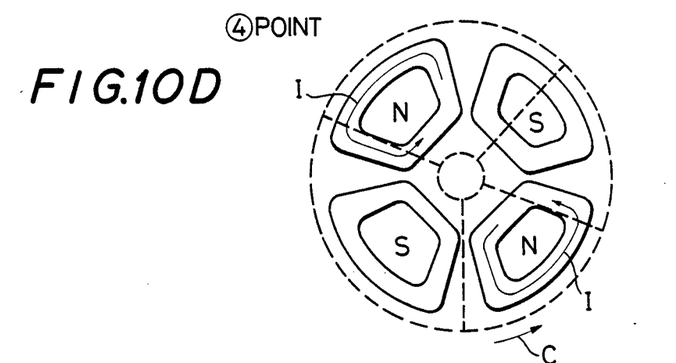
Figure 10E:
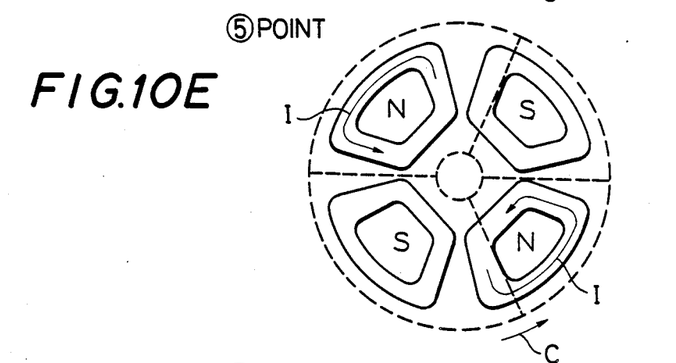
Figure 10F:
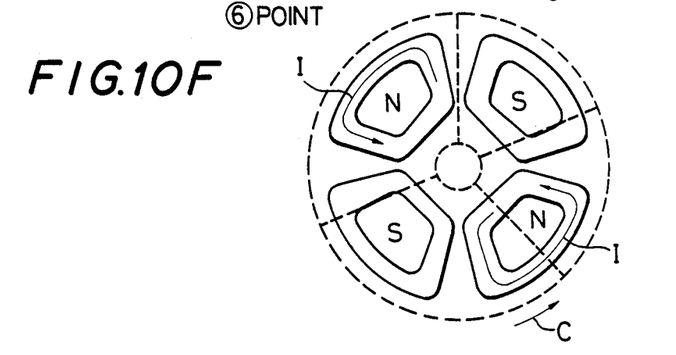
Figure 10G:
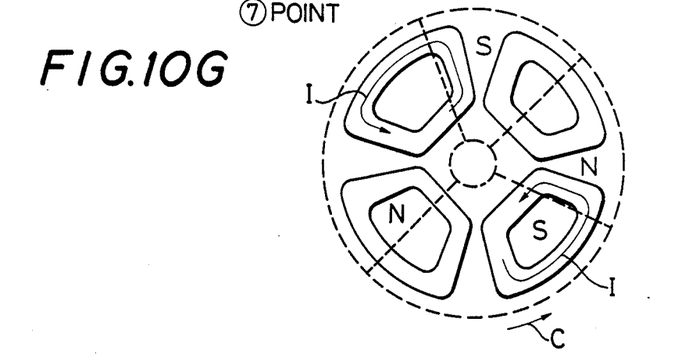
Figure 10H:
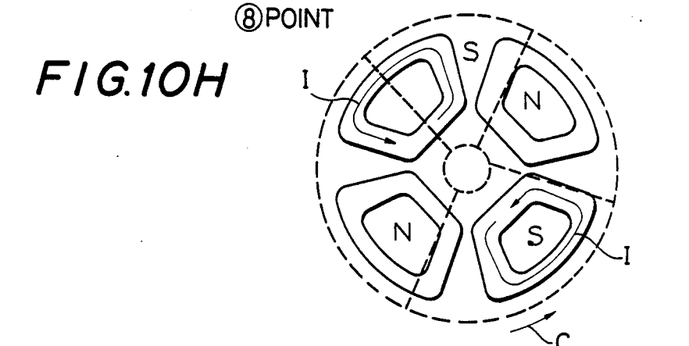
Figure 10I:
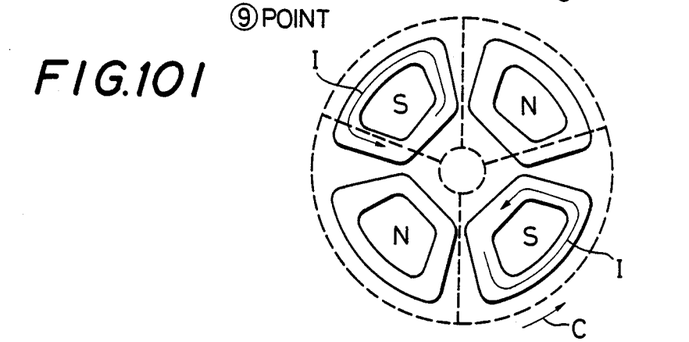

FIG. 9 shows synthetically the torque characteristics of the two-phase brushless motor. In FIG. 9, curves $A_1+A_2$ and $B_1+B_2$ are obtained by superposing the waveforms $A_1$ and $B_1$ on the waveforms $A_2$ and $B_2$, respectively.

As shown in FIG. 7, the torque waveforms obtained due to the respective functions of the coils $1_{A1}$ and $1_{A2}$ differ from each other, and similarly, the torque waveforms obtained due to the respective functions of the coils $1_{B1}$ and $1_{B2}$ differ from each other as shown in FIG. 8. A phase difference of 180° electrical is present between the waveforms $A_1+A_2$ and $B_1+B_2$. Thus, the relationship between the magnetic poles $4_N$ and $4_S$ and the magnetic poles $5_N$ and $5_S$ is not such that one is a main magnetic pole and the other is a supplemental magnetic pole, but instead, all of the magnetic poles $4_N$, $4_S$, $5_N$ and $5_S$ substantially function as main magnetic poles.

FIGS. 10A to 10I show successively the relationships between the stator and the rotor located at various relative rotation angles. The states shown in FIGS. 10A to 10I correspond to torque waveform portions 1 to 9 shown in FIG. 9, respectively. In FIGS. 10A to 10I, arrow C indicates the direction of rotation of the rotor, and I denotes a current flow supplied to the coils. Rotor position detecting means are provided for the embodiment of FIGS. 10A to 10I for current switching, also such means is not shown for reasons of clarity.

In FIG. 9, curve portions 1, 5 and 9 correspond to respective switching points at which the current that is supplied to the coils $1_{A1}$ and $1_{A2}$ is changed so as to be supplied to the coils $1_{B1}$ and $1_{B2}$, or vice versa. The portions of the coils $1_{A1}$, $1_{A2}$, $1_{B1}$ or $1_{B2}$ which are effective in generating the motor torque are in opposed relation to the magnetic poles of the rotor, so that the motor torque dips most at each of the switching points 1, 5 and 9.

Figure 11:
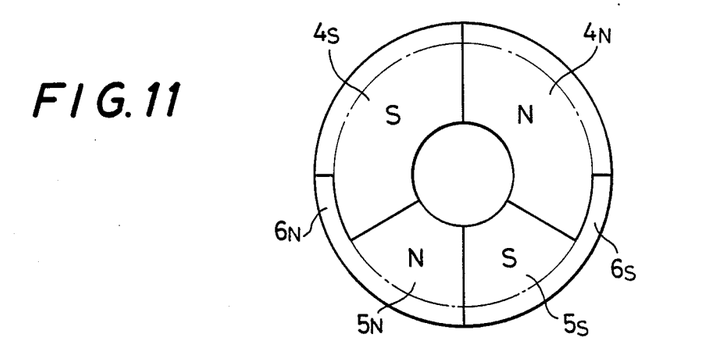
FIGS. 11 and 12 are plan views of rotor magnet arrangements exemplifying other magnetizing patterns according to a second and a third embodiment of this invention, respectively.
Figure 12:
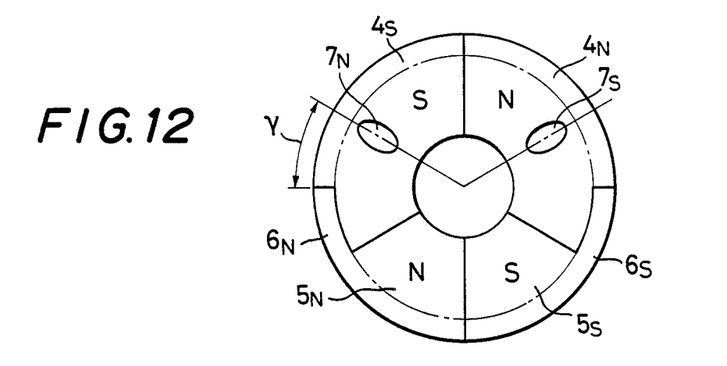
Figure 13:
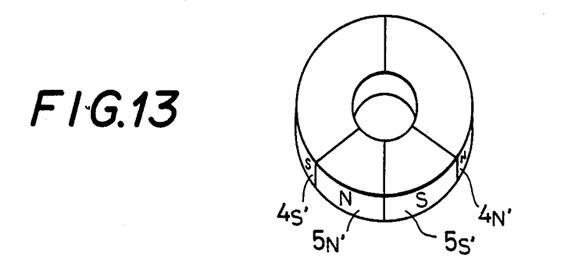
FIG. 13 is a perspective view of a rotor magnet arrangement of an inner-rotor-type brushless motor exemplifying another magnetizing pattern according to a fourth embodiment of this invention.

FIGS. 11, 12 and 13 show second, third and fourth embodiments, respectively, of the invention embodied in variations of the magnetizing pattern of the rotor. In the second embodiment shown in FIG. 11, outer parts $6_N$ and $6_S$ of the magnetic poles $5_N$ and $5_S$ are provided projecting into the magnetic poles $4_N$ and $4_S$, respectively. The outer parts $6_N$ and $6_S$ are positioned for detection by the Hall device, or position detector 4, shown in FIG. 3. Thus, in the illustrated embodiment of FIG. 11, the Hall device 4 provided opposite the outer parts $6_N$ and $6_S$ switches the current flowing in the coils at each quarter turn of the rotor, corresponding to the switching points 1, 5 and 9 of FIG. 9.

In the third embodiment shown in FIG. 12, supplemental magnetic poles $7_N$ and $7_S$ are arranged in the respective magnetic poles $4_N$ and $4_S$ of a rotor similar to that shown in FIG. 11. The supplemental magnetic poles $7_N$ and $7_S$ perform the same function as the supplemental magnetic poles $3_N$ and $3_S$ shown in FIG. 2. An electrical angle $\gamma$ shown in FIG. 12 is about 30° electrical.

In the fourth embodiment shown in FIG. 13, magnetic poles $4_N'$, $4_S'$, $5_N'$, and $5_S'$ are arranged on the periphery of a rotor so as to apply the principles of the instant invention to an inner-rotor-type brushless motor.

Figure 14:
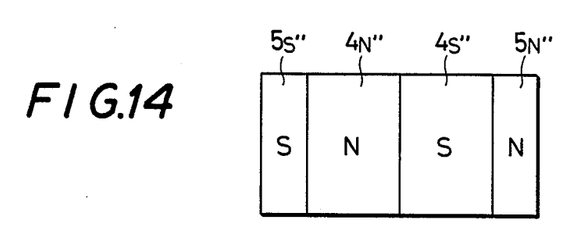
FIGS. 14 and 15 are development views of rotors exemplifying yet other magnetizing patterns according to fifth and sixth embodiments of this invention.
Figure 15:
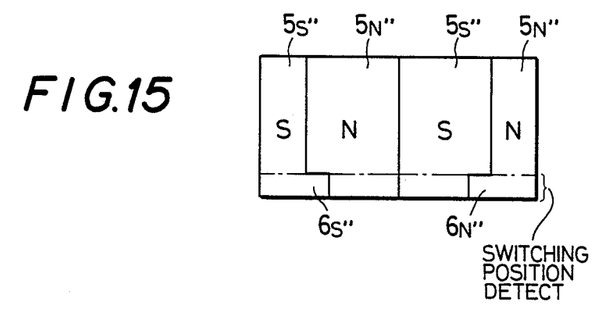

FIGS. 14 and 15 are development views of hollow cylindrical rotors which show fifth and sixth embodiments, respectively. The hollow cylindrical rotors are used in an outer-rotor-type brushless motor. Two pairs of magnetic poles $4_N''$, $4_S''$, $5_N''$ and $5_S''$ are provided on each rotor, where corresponding ones of the poles have a ratio of two to one.

Figure 16:
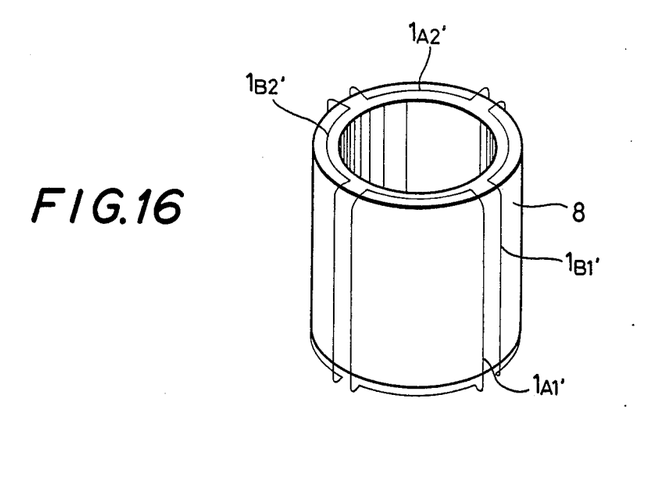
FIG. 16 is a perspective view of a stator in an outer-rotor-type brushless motor.

FIG. 16 shows a stator used in the outer-rotor-type brushless motor, in which the coils $1_{A1}'$, $1_{A2}'$, $1_{B1}'$ and $1_{B2}'$ are arranged on the outer periphery of a cylindrical yoke 8.

Figure 17:
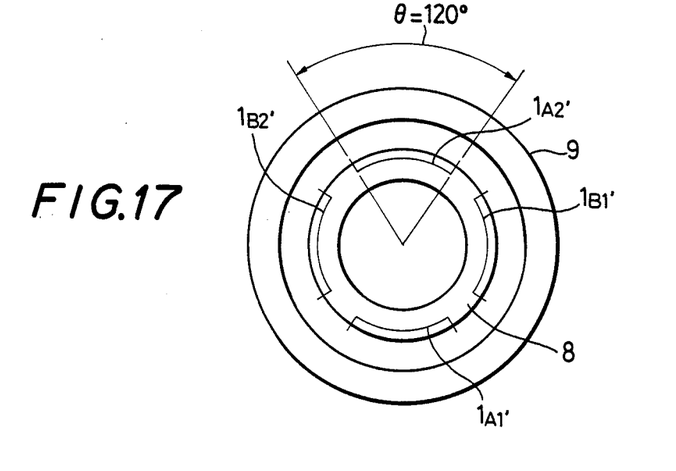
FIG. 17 is a plan view of the outer-rotor-type brushless motor, the stator of which is shown in FIG. 16.

In FIG. 17, a plan view of an outer-rotor-type brushless motor is shown, including the stator 8 shown in FIG. 16 surrounded by a cylindrical rotor 9, such as a rotor shown in either FIG. 14 or 15. The coils $1_{A1}'$, $1_{A2}'$, $1_{B1}'$ and $1_{B2}'$ are wound so that each has an electrical angle $\theta$ of about 120° electrical.

The magnetizing patterns shown in either FIG. 14 or 15 are formed on the inner periphery of the hollow-cylindrical rotor 9. Outer portions $6_S''$ and $6_N''$ are provided on the embodiment of FIG. 15 opposite a magnetic polarity sensor, such as the Hall-effect device 4 to effect switching of the current through the coils $1_{A1}'$, $1_{A2}'$, $1_{B1}'$ and $1_{B2}'$. The supplemental magnetic poles $7_N$ and $7_S$ shown in FIG. 12 is added in another embodiment to the magnetizing pattern shown in FIG. 15. Further, the magnetizing patterns shown in FIGS. 14 and 15 may be arranged on a face of the rotor 9 which extends in a thickness direction of the rotor 9.

In the first to sixth embodiments, the invention is applied to a two-phase brushless motor having four poles and four coils, but the number of poles and coils may be increased between natural numbers m and n which are the number of the coils and poles denoted by $4m$ and $4n$, respectively, provided m is not larger than n. Further, a good torque characteristic of the motor has been empirically obtained under the condition that $\alpha$ is about 240° electrical and $\beta$ is about 120° electrical in the case of the rotor shown in FIG. 6, but the value may be varied in a range of 240° electrical ±k, where k is less than 60° electrical.

Figure 18:
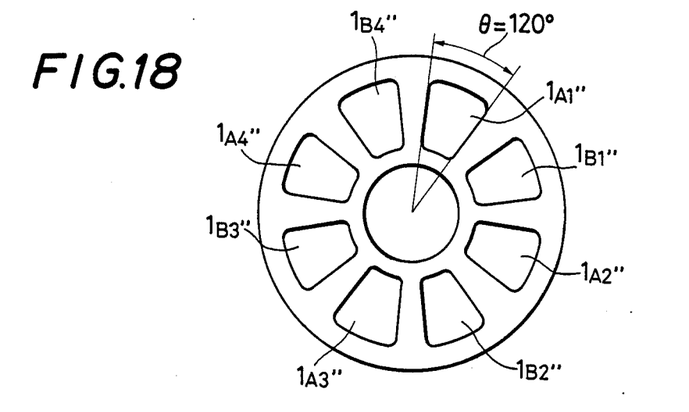
FIGS. 18, 19 and 20 are plan views of stators showing various arrangements of coils according to seventh, eighth and ninth embodiments of this invention; and, FIG. 21 is a plan view of a rotor exemplifying yet a further magnetizing pattern according to a tenth embodiment of this invention.
Figure 19:
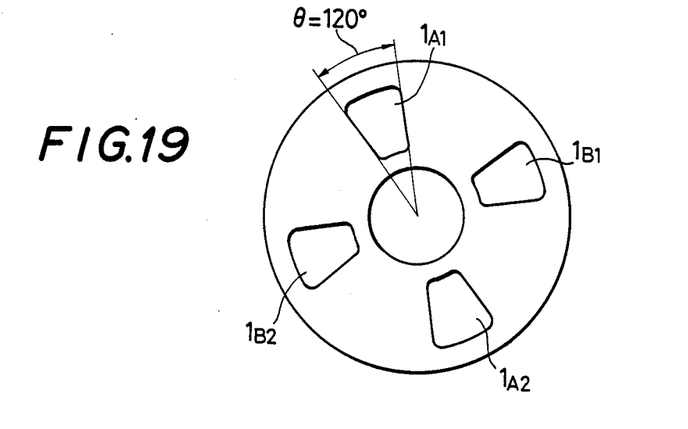
Figure 20:
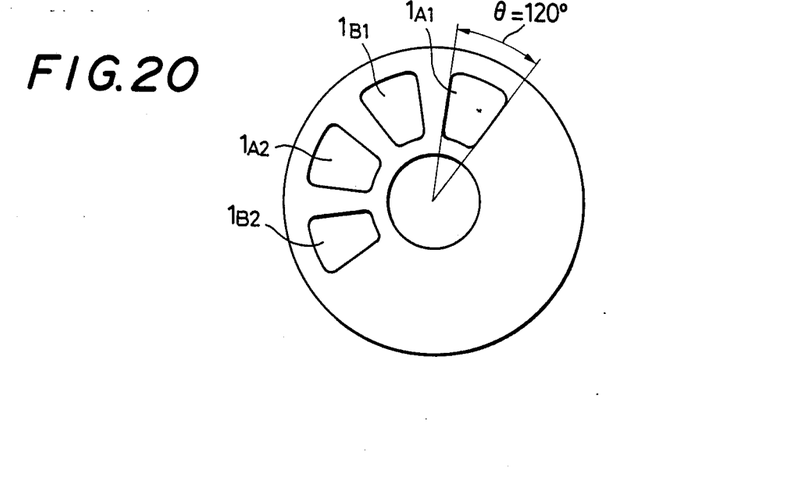

The magnetic pole arrangement of the rotor of a brushless two-phase motor has been varied in different embodiments. In seventh, eighth and ninth embodiments shown in FIGS. 18, 19 and 20, the coils of the stator are varied in arrangement. In FIG. 18, the seventh embodiment provides two groups of coils comprising four coils $1_{A1}''$ to $1_{A4}''$ and four coils $1_{B1}''$ to $1_{B4}''$ for a total of eight coils. The electrical angle $\theta$ of each coil is 120°. In FIGS. 19 and 20, arrangements of four coils $1_{A1}$, $1_{A2}$, $1_{B1}$ and $1_{B2}$ are varied in different arrangements. Again, each coil has an electrical angle $\theta$ of 120°.

Figure 21:
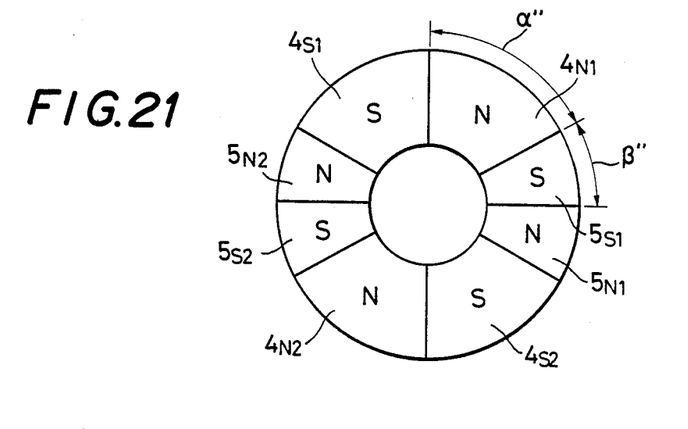

In a tenth embodiment, a rotor is provided as shown in FIG. 21. The number of poles is $4n$, for n equals a natural number. Here, the number of poles is eight, so that n is equal to two. The magnetizing pattern comprises two pairs of magnetic poles $4_{N1}$, $4_{S1}$, $4_{N2}$ and $4_{S2}$, each having a width $\alpha'$, and two pairs of magnetic poles $5_{N1}$, $5_{S1}$, $5_{N2}$ and $5_{S2}$, each having a width $\beta'$. The ratio of the widths $\alpha'$ to $\beta'$ are the same as in the embodiment of FIG. 6, in other words, two to one.

According to the invention, torques exerted on the rotor are obtained from the interaction of phases A and B produced by the respective coils with the magnetic poles $4_N$, $4_S$, $5_N$ and $5_S$, the torque being different from each other, so that the magnetizing pattern of the rotor can be simplified as, for example, the pattern shown in FIG. 6 which is simple compared with that of the conventional two-phase brushless motor, in which the rotor has extremely narrow magnetic poles. Hence, the rotor of the present invention can be easily magnetized.

Although other modifications and changes may be suggested by those skilled in the art, it is the intention of the inventor to embody within the patent warranted hereon all changes and modifications as reasonably and properly come within the scope of his contribution to the art.

I claim as my invention:

1. A two-phase brushless motor, comprising:
  a rotor having at least a pair of uniformly magnetized main regions and at least a pair of uniformly magnetized sub-regions, wherein ratios of the widths of said magnetized main regions to the widths of said magnetized sub-regions are two to one and wherein said magnetized main regions are adjacent one another and said magnetized sub-regions are adjacent one another;
  a stator positioned in opposed relation to said rotor and having at least two pairs of two coils connected in series for producing respective phases of magnetic fields, wherein said two coils in each of said pair of coils are spaced from each other by an electrical angle of 360° electrical;
  a sensor mounted in a fixed position relative to said stator and positioned opposite an outer part of said rotor; and
  outer magnetized regions of said rotor disposed opposite said sensor and arranged for sequential sensing by said sensor, said outer magnetized regions including oppositely magnetized regions having relative widths of a ratio of one to one, a portion of ones of said outer regions overlapping said magnetized sub-regions on said rotor.

2. A two-phase brushless motor, comprising:
  a stator having at least two pairs of series connected coils for producing two respective phases of a magnetic field;
  a rotor rotationally mounted opposite said stator to provide a torque output, said rotor having at least a pair of first magnetic poles and at least a pair of second respectively oppositely magnetized magnetic poles, a width of said first magnetic poles to a width of said second magnetic poles having a ratio of approximately two to one and said pair of first magnetic poles being adjacent and said pair of second magnetic poles being adjacent, said rotor being of a disk shape and each of said second magnetic poles having an outer part extending into said first magnetic poles along an edge of said disk shaped rotor;
  a magnetic position sensor disposed opposite an edge of said rotor to sense said outer part of said second magnetic poles;
  a current switching circuit connected to supply current to said coils of said stator, said magnetic position sensor connected in said current switching circuit to effect switching;
  a supplemental magnetic pole of said rotor arranged in a position surrounded circumferentially by each of said first magnetic poles, said supplemental magnetic poles being oppositely magnetized relative to said first magnetic poles.

* * * * *